United States Patent
Järvenkylä et al.

[11] Patent Number: 5,975,143
[45] Date of Patent: Nov. 2, 1999

[54] METHOD FOR MANUFACTURING A CORRUGATED PIPE, AND A CORRUGATED PIPE MANUFACTURED BY THE METHOD

[75] Inventors: Jyri Järvenkylä, Hollola, Finland; Björn Olsson, Alingsås, Sweden; Dieter Scharwächter, Ochtrup, Germany; Lennart Ågren, Borås, Sweden

[73] Assignee: Uponor B.V., Amsterdam, Netherlands

[21] Appl. No.: 08/913,649

[22] PCT Filed: Apr. 3, 1995

[86] PCT No.: PCT/FI95/00178

§ 371 Date: Dec. 9, 1997

§ 102(e) Date: Dec. 9, 1997

[87] PCT Pub. No.: WO96/31723

PCT Pub. Date: Oct. 10, 1996

[51] Int. Cl.$^6$ .............................. F16L 11/00; B29C 43/22
[52] U.S. Cl. .................... 138/121; 138/141; 138/137; 264/508; 264/515
[58] Field of Search ................... 138/121, 122, 138/137, 141; 264/508, 515

[56] References Cited

U.S. PATENT DOCUMENTS

| | | | |
|---|---|---|---|
| 3,550,639 | 12/1970 | Okuda | 138/109 |
| 3,872,893 | 3/1975 | Roberts | 138/121 |
| 4,269,234 | 5/1981 | Johnson et al. | 138/121 |
| 4,303,104 | 12/1981 | Hegler et al. | 138/121 |
| 4,534,923 | 8/1985 | Lupke | 138/121 X |
| 4,620,569 | 11/1986 | Von Glanstatten et al. | 138/121 X |
| 4,865,797 | 9/1989 | Jarvenkyla | 264/508 |
| 5,324,557 | 6/1994 | Lupke | 138/121 X |
| 5,390,704 | 2/1995 | Kanao | 138/121 |
| 5,803,132 | 9/1998 | Lupke | 138/121 X |

FOREIGN PATENT DOCUMENTS

| | | |
|---|---|---|
| 0213674 | 3/1987 | European Pat. Off. |
| 930005 | 7/1955 | Germany |
| 4128654 | 3/1993 | Germany |

*Primary Examiner*—Patrick Brinson
*Attorney, Agent, or Firm*—Ladas & Parry

[57] ABSTRACT

The invention relates to a method for manufacturing a multi-layer corrugated pipe and to a corrugated pipe manufactured by the method and comprising an inner tube (2), a corrugated outer tube (5) and a plastic layer therebetween. Separate layers (3,6) of plastic are formed on the outer surface of the inner tube (2) and the inner surface of the outer tube (5), said separate layers of plastic being affixed to one another at least at the web portions (5a) of the corrugations of the outer tube (5) when the inner tube and outer tube are connected.

20 Claims, 2 Drawing Sheets

METHOD FOR MANUFACTURING A CORRUGATED PIPE, AND A CORRUGATED PIPE MANUFACTURED BY THE METHOD

The present invention relates to a method for manufacturing a corrugated pipe and to a corrugated pipe manufactured by the method, being formed of an inner tube, a corrugated outer tube and a plastic layer therebetween.

Finnish Patents 60 825, 74 654 and 77 405, for example, teach production lines for corrugated pipe, in which plastified plastic mass is extruded with a nozzle between movable forming means pressed against one another to produce a continuous corrugated pipe. This solution provides high-quality, commercially advantageous corrugated pipe products.

To save in weight and expensive raw materials, corrugated pipe is also manufactured as double-walled pipe, so that the inner pipe consists of a conventional smooth-surfaced tube and the outer pipe of a corrugated tube formed thereon, cf. e.g. European Patent 385 465. The use of recycled plastic has been investigated in pipes manufactured in accordance with this technology so that the outer pipe has been made of recycled plastic. Thus corrugated recycled plastic can as such replace the outer tube of European Paten 385 465, or it can be employed in a foamed state to form a corrugated profile filled with foam on the inner tube.

The long-term mechanical strength of recycled plastic, which may be poor and sometimes unpredictable, constitutes the drawback of these pipes. For this reason, such tubes cannot be used in applications that require that the pipe be manufactured to design specifications of standard tubes.

Solutions are also known in which a layer of recycled plastic is disposed between a smooth inner tube and a corrugated outer tube, cf. German Offenlegungsschrift 41 28 654. This solution is attended by the drawback that in pressing the outer tube against the layer of recycled plastic to produce a bond between the layers, substantial flashes of displaced recycled plastic are formed at the web portions of the corrugations in the outer tube. These flashes have no part in the load-carrying capacity of the pipe and thus impart an unnecessary additional weight to the pipe.

Lastly, the pipe disclosed in U.S. Pat. No. 5,324,557 provides an example of 'ribbed pipe' incorporating recycled plastic. In this pipe, a layer which may be of recycled plastic is provided between the outer tube comprising ribs and the inner tube. As is stated in this reference, corrugated tube differs from ribbed tube by structure and characteristics. Since the ribs in a ribbed tube are always filled, the above flash problem encountered with recycled plastic will not arise.

It is an object of the present invention to provide a method for manufacturing a corrugated pipe and a corrugated pipe manufactured by the method which avoid the above-stated drawbacks and which enable a way of employing recycled plastic in corrugated pipes which is more efficient than has previously been thought possible, and also flexible. The method of the invention is characterized in that separate layers of plastic are formed on the outer surface of the inner tube and the inner surface of the outer tube, said separate layers of plastic being affixed to one another at least at the web portions of the corrugations of the outer tube when the inner tube and outer tube are connected.

The most significant advantage of the invention is that the outer tube can be made thinner than previously, since a separate supporting layer increasing its resistance against buckling in particular is provided on the inner surface thereof. Furthermore, no unwanted flashes are produced when the inner and outer tube are brought together, but all plastic material in the pipe takes part in carrying outer or inner loads. Further advantages are afforded by the fact that by using separate layers, the layer thickness, characteristics and material can be tailored individually. This affords a considerable advantage in that by adjusting the amount and density of foam, the ring stiffness of the pipe can be easily modified without changing the joint dimensions of the pipe, such as the outer and inner diameter. Design of conventional corrugated double-walled pipes is determined by the required ring stiffness and the fact that the corrugations shall not buckle when the pipe is loaded. When a low weight is striven for, the optimum pipe geometry can only be selected within a rather narrow range. The advantage of the invention resides in that the foam support layers afford a broader range within which the geometry can be varied while the outer dimensions of the pipe remain the same. In a preferred embodiment, when the foam is light and thin, the pipe has a stiffness of e.g. 4 $kN/m^2$. By increasing the amount and density of foam, the stiffness can in the best case be quadrupled for demanding applications, while the geometry remains the same. Thus the same joint dimensions can be employed, i.e. the jointing needs of widely different pipes can be met with the same seal and pipe joint. This is normally not possible, since either the inner or outer diameter of the pipe changes materially in different stiffness classes, and it is desired to keep the weight low. Thus a less severe "punishment" for using the same geometry in different stiffness classes is achieved with the use of supporting foam.

Other preferred embodiments of the method and the pipe of the invention are characterized in that which is set forth in the appended claims.

Figure 1:
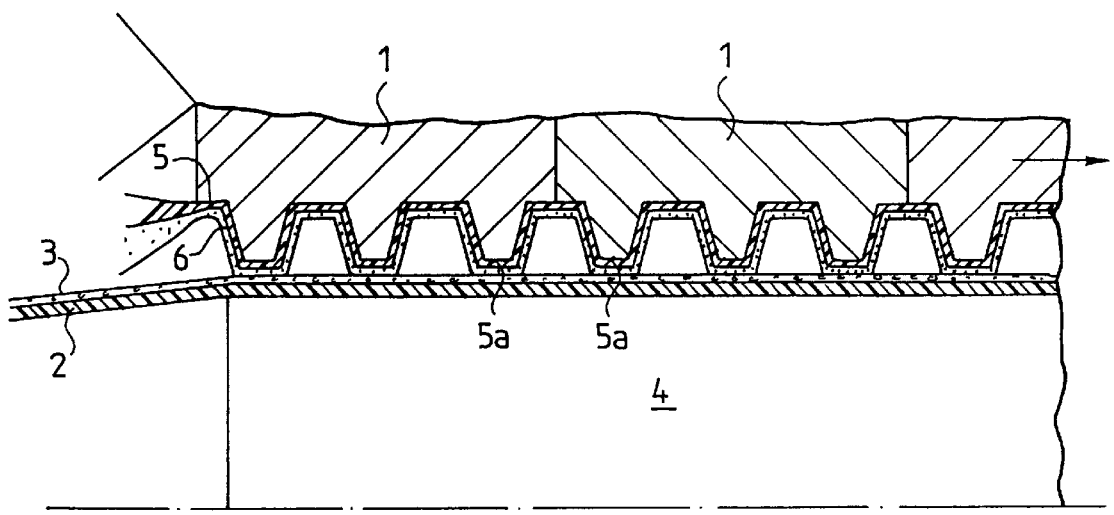
FIG. 1 is a general view of a step of manufacturing corrugated pipes.

The corrugator shown in FIG. 1 generally comprises two superimposed paths of rotation of mould parts 1, i.e. chill moulds moving in the direction of the arrow (herein only the topmost path has been shown). The chill moulds impart to the corrugated pipe its outer shape. The basis functions of such production apparatus are obvious to those skilled in the art and will not be explained in detail in this context. In accordance with the invention, a smooth inner tube 2 and a layer 3, preferably of foamed recycled plastic, formed thereon are introduced from a coextruder, for instance, to a mandrel 4 of the corrugator. Simultaneously an outer tube 5 and a layer 6, likewise preferably of foamed recycled plastic, formed on the inner surface of the outer tube 5 are brought against the mould surfaces of the moving chill moulds 1. Layers 5 and 6 can be retained against the mould surfaces by applying a positive pressure in the space between the mandrel 4 and the layers and/or generating a negative pressure between the layers and the chill moulds 1, as disclosed in U.S. Pat. No. 4,865,797.

The plastic layers 3 and 6 formed on the outer surface of the inner tube 2 and on the inner surface of the outer tube 5 are affixed to one another in the corrugator at least at the web portions 5a of the outer tube 5 of the layer. Since layers 3 and 6 are in a soft state and possible being foamed when they are brought together, they are affixed to one another without any need for pressing, thus avoiding formation of unwanted flashes.

Figure 2:
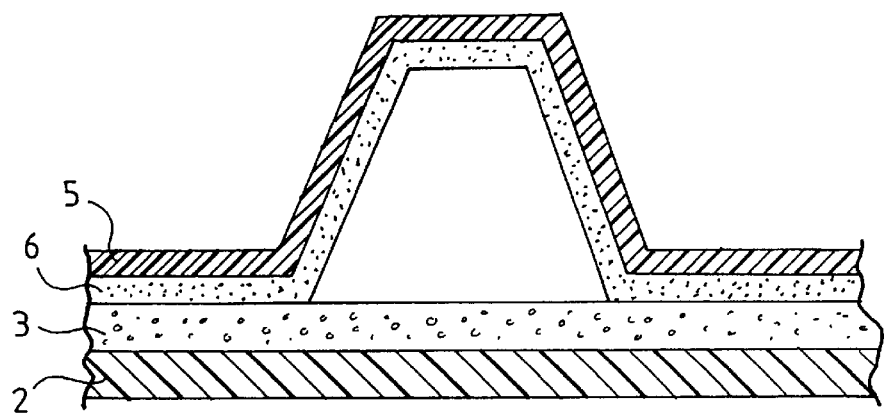
FIG. 2 shows an embodiment of a corrugated pipe of the invention.

FIG. 2 shows an embodiment of the pipe of the invention on a larger scale, wherein the foamed plastic layer 3 formed on the outer surface of the inner tube 2 has a different porosity structure than the foamed plastic layer 6 formed on the inner surface of the outer tube 5. By using comparatively small-pore foaming in forming layer 6, a stiffer structure is achieved in the pipe corrugations than when using a foaming technique producing a large amount of foam with large pores. This is of advantage, since on account of the stiffer structure the thickness of the more expensive outer tube and the risk of buckling of the corrugations in the structure can be reduced. Also, the stiffer and thicker the wall is the less the tendency of the pipe wall to buckle. Plastic layer 3 is not subject to the danger of buckling, and thus the latter foaming technique may be employed for that layer.

One problem with the manufacturing technology is that the mechanical strength of the foam decreases more rapidly than its density in relation to the degree of foaming. In other words, if the density of the foam is for example half of the density of the plastic, its mechanical properties have perhaps only a third of their initial value. In particular, the long-term strength properties, such as creep resistance, are impaired. It has now unexpectedly been found that by cross-linking a polyolefin foam, such as polyethylene or polypropylene foam, the creep resistance properties can be substantially improved. Thus the properties of foam based on plastics waste, which has varying characteristics, can be brought to a level that can be relied upon in design in view of long-term strength properties.

The layers can be foamed by the conventional chemical method in which a foaming chemical is added to the plastic, with the result that the plastic is foamed when it squirts out into the foaming zone which has a lower pressure.

An alternative method is to mix gas mechanically into the layer to be foamed in a nozzle or extruder. When the pressure in the forming zone in the corrugator is relieved, the gas expands and foams the plastic.

Cross-linking agents, such as peroxides or azo compounds, may if desired be added into plastic forming foamed plastic layers to produce chemical cross-linking. The characteristics of a cross-linked foamed plastic layer are homogenized, and thus the quality and creep properties are improved. The degree of cross-linking can be easily adjusted in accordance with the required characteristics. A conventional cross-linked polyethylene pressure pipe requires a degree of cross-linking of about 70% in order that good strength properties may be achieved. In sewer pipes, a degree of cross-linking of 30–60% already improves the creep properties considerably.

Figure 3:
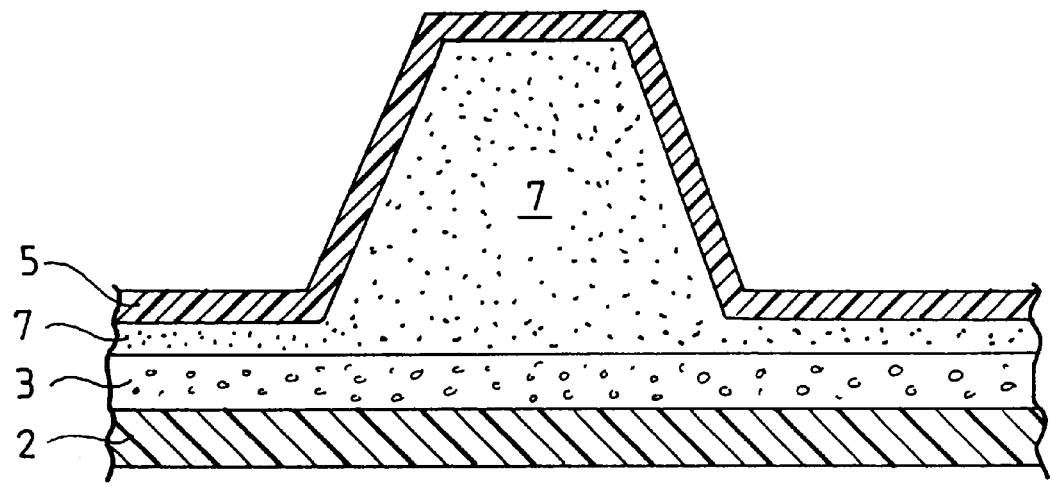
FIG. 3 shows another embodiment of the corrugated pipe of the invention.

FIG. 3 shows on a large scale another embodiment of the pipe of the invention, wherein a foamed plastic layer 7 is formed on the inner surface of the outer tube 5. The plastic layer fills up the space between the ribs of the outer tube and the inner tube substantially entirely. Thus, when the plastic layer 7 is foamed, it is easy to produce a positive pressure effectively pressing the ribs of the outer tube against the mould surfaces of the chill moulds 1, simultaneously providing a corrugated pipe the outer surface of which has a very good finish. The risk of buckling of the corrugations has practically been eliminated in such a structure, which fact is of special importance when a comparatively stiff rubber seal is placed between the ribs. In a conventional double-walled pipe, the corrugations will easily yield at their lateral sides, with the result that the surface pressure of the rubber ring seal decreases.

Figure 4:
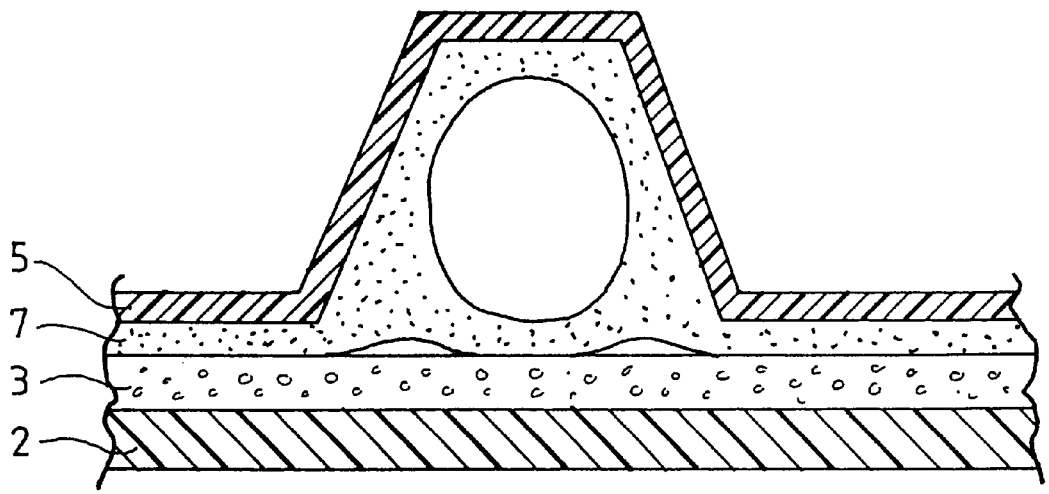
FIG. 4 shows still another embodiment of the corrugated pipe of the invention.

In the embodiment of FIG. 4, the foam layer 7 is hollow at the corrugation.

It is obvious to those skilled in the art that the invention is not restricted to the above examples, but the different embodiments of the invention may vary within the scope of the appended claims.

We claim:

1. In a method for manufacturing a mulit-layer corrugated pipe formed with an inner tube, a corrugated outer tube and a first layer of plastic therebetween, the improvement wherein the pipe is also formed with a second layer of plastic, the first and second layers of plastic being formed on an outer surface of the inner tube and an inner surface of the outer tube respectively or vice versa, the improvement further comprising affixing the first and second layers to one another at least at web portions of corrugations of the outer tube with the inner tube and outer tube connected.

2. The method as claimed in claim 1, wherein the plastic in each of the first and second layers is recycled plastic.

3. The method as claimed in claim 1, wherein the plastic in each of the first and second layers is foamed plastic.

4. The method as claimed in claim 3, wherein a compound is added to the first or second foamed plastic layer or both to produce chemical cross-linking of said layer or layers.

5. The method as claimed in claim 3, wherein the plastic of the layer formed on the inner surface of the outer tube is foamed to fill up substantially an entire space between the inner surface of the outer tube and the layer formed on the outer surface of the inner tube.

6. The method as claimed in claim 4, wherein the plastic of the layer formed on the inner surface of the outer tube is foamed to fill up substantially an entire space between the inner surface of the outer tube and the layer formed on the outer surface of the inner tube.

7. The method as claimed in claim 5, wherein the plastic of the first or second layer formed on the inner surface of the outer layer is foamed with the generation of a positive pressure that presses ribs of the outer tube against a corrugation mold.

8. The method as claimed in claim 3, wherein the foamed plastic in the first layer is different from the foamed plastic in the second layer such that the first layer has a different porosity structure than the second layer.

9. The method as claimed in claim 4, wherein the formed plastic in the first layer is different from the foamed plastic in the second layer such that the first layer has a different porosity structure than the second layer.

10. The method as claimed in claim 5, wherein the foamed plastic in the first layer is different from the foamed plastic in the second layer such that he first layer has a different porosity structure than the second layer.

11. In a multi-layer corrugated pipe comprising an inner tube, a corrugated outer tube and a first layer of plastic therebetween, the improvement wherein the pipe also comprises a second layer of plastic, the first and second layers of plastic being formed on an outer surface of the inner tube and an inner surface of the outer tube respectively or vice versa, said first and second layers affixing the inner tube and outer tube to one another at least at web portions of corrugations of the outer tube.

12. The pipe as claimed in claim 11, wherein the plastic in each of the first and second layers is recycled plastic.

13. The pipe as claimed in claim 11, wherein the plastic in each of the first and second layers is foamed plastic.

14. The pipe as claimed in claim 13, wherein the first or second foamed plastic layer or both is cross-linked.

15. The pipe as claimed in claim 13, wherein the plastic of the layer formed on the inner surface of the outer tube fills up substantially an entire space between the inner surface of the outer tube and the layer formed on the outer surface of the inner tube.

16. The pipe as claimed in claim 13, wherein the first layer of foamed plastic has a different porosity than the second layer of foamed plastic.

17. The pipe as claimed in claim 14, wherein the first layer of foamed plastic has a different porosity than the second layer of foamed plastic.

18. The pipe as claimed in claim 15, wherein the first layer of foamed plastic has a different porosity than the second layer of foamed plastic.

19. The pipe as claimed in claim 11, wherein the pipe has a ring stiffness of 4 kN/m$^2$ when the first and second layers have approximately the same thickness as the inner and outer tubes.

20. The pipe as claimed in claim 11, wherein the pipe has a stiffness with the corrugation filled with high-density plastic that is at least twice the stiffness of an unfilled pipe.

* * * * *